US009821707B2

(12) United States Patent
Decaluwe et al.

(10) Patent No.: US 9,821,707 B2
(45) Date of Patent: Nov. 21, 2017

(54) USER-FOLLOWING VEHICLE ILLUMINATION SYSTEM

(71) Applicant: GM Global Technology Operations LLC, Detroit, MI (US)

(72) Inventors: Mary Decaluwe, Oxford, MI (US); Carl W. Wellborn, Detroit, MI (US); Thomas R. Brown, Shelby Township, MI (US); Christopher Kumle, Warren, MI (US); Daniel Rudd, Saint Clair Shores, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/343,548

(22) Filed: Nov. 4, 2016

(65) Prior Publication Data

US 2017/0120802 A1    May 4, 2017

Related U.S. Application Data

(60) Provisional application No. 62/250,916, filed on Nov. 4, 2015.

(51) Int. Cl.
*B60Q 1/26* (2006.01)
*B60Q 1/24* (2006.01)
(Continued)

(52) U.S. Cl.
CPC ............. *B60Q 1/24* (2013.01); *B60Q 1/0023* (2013.01); *B60Q 3/0293* (2013.01);
(Continued)

(58) Field of Classification Search
CPC .... B60Q 3/0293; B60Q 11/005; B60Q 1/387;
B60Q 1/2603; B60Q 3/048; B60Q 1/44;
B60Q 1/143; B60Q 1/1423; B60Q 9/001;
B60Q 2300/112; B60Q 2300/314; B60Q
1/1415; B60Q 2300/42; B60R 16/03;
H02K 21/48; B62J 6/001; B62J 6/003;
H02J 7/1492
(Continued)

(56) References Cited

U.S. PATENT DOCUMENTS

| 6,587,573 | B1* | 7/2003 | Stam | B60Q 1/085 |
| | | | | 340/930 |
| 2015/0298607 | A1* | 10/2015 | Salter | B60Q 3/82 |
| | | | | 315/77 |

* cited by examiner

*Primary Examiner* — Minh D A
(74) *Attorney, Agent, or Firm* — Mickki D. Murray; Parks IP Law LLC

(57) ABSTRACT

A user-position-focused vehicle lighting system comprising a hardware-based processing unit and a non-transitory computer-readable storage device having a user-position-determination module that, when executed by the processing unit, determines a vehicle user position proximate a vehicle. The storage device also includes a vehicle-lighting-identification module that, when executed by the processing unit, determines, based on the vehicle user position, which of multiple vehicle lighting features should be illuminated, yielding a presently selected lighting feature. The storage device also includes a vehicle-lighting-activation module configured to, when executed by the processing unit, send a signal to the presently selected lighting feature to illuminate the presently selected lighting feature. In various embodiments, the technology includes the storage device separate from the processing unit, and processes performed by the system.

20 Claims, 2 Drawing Sheets

(51) Int. Cl.
 *B60Q 1/00* (2006.01)
 *H05B 37/02* (2006.01)
 *B60Q 3/02* (2006.01)
(52) U.S. Cl.
 CPC ..... *H05B 37/0218* (2013.01); *H05B 37/0227* (2013.01); *H05B 37/0272* (2013.01); *B60Q 2400/20* (2013.01); *B60Q 2400/40* (2013.01)
(58) Field of Classification Search
 USPC .......................................................... 315/80
 See application file for complete search history.

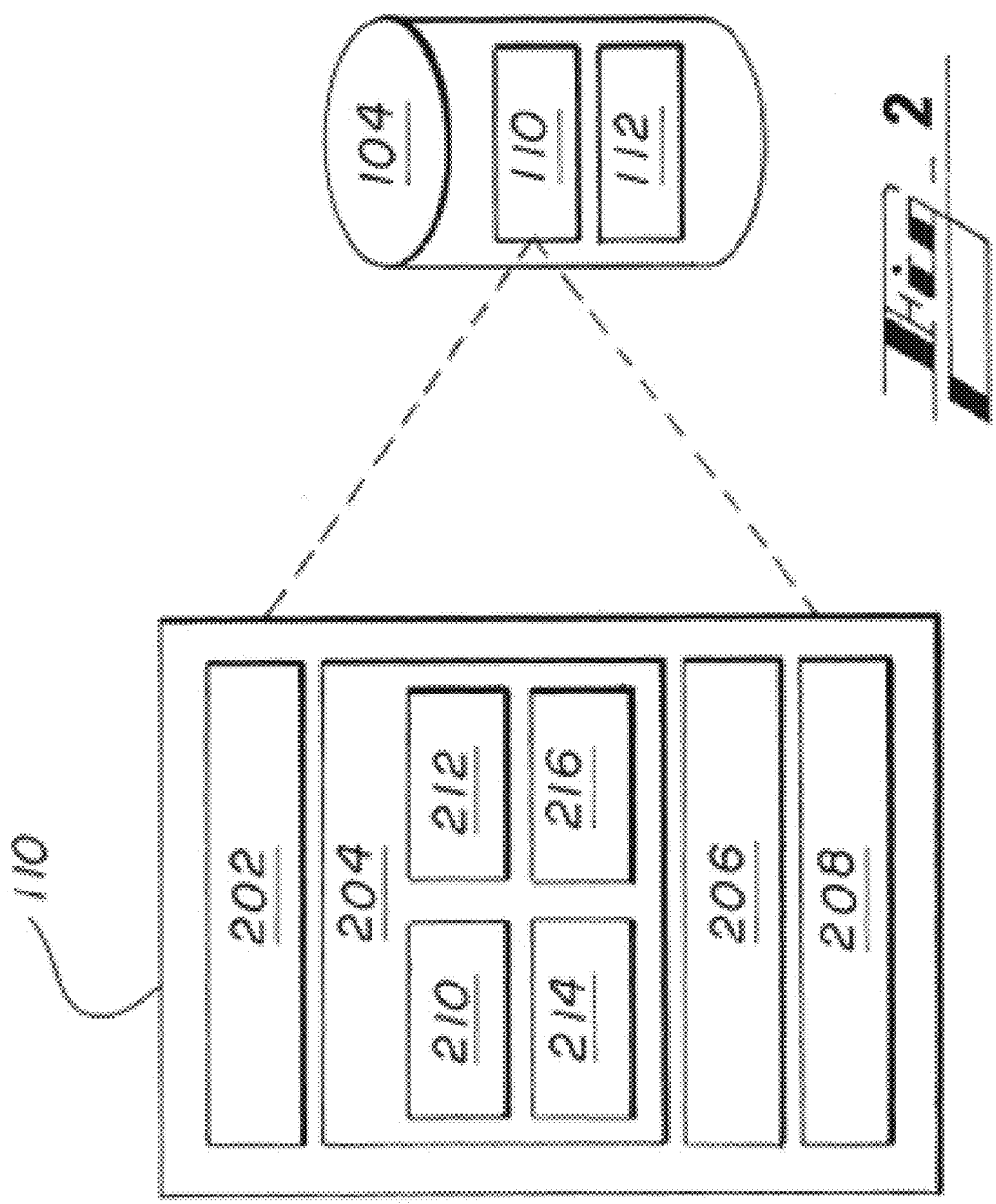

USER-FOLLOWING VEHICLE ILLUMINATION SYSTEM

TECHNICAL FIELD

The present disclosure relates generally to systems and methods for illuminating an external area adjacent a vehicle and, more particularly, to systems and methods for illuminating the areas selectively based on user motion around the vehicle, for benefits including user safety, comfort, and convenience.

BACKGROUND

Modern vehicles have many electronic features promoting convenience and safety. An example is lighting fixtures positioned adjacent external or internal door handles. The exterior door-handle lights typically illuminate in response to the user unlocking the vehicle by a keyfob. Interior door-handle lights illuminate when the vehicle is put in park and turned off, to help the user find the handle for egress.

Other example conventional lighting systems include overhead or floor interior lighting, which may be wired to illuminate whenever a door is opened, and trunk or cargo area lighting, which illuminate when the vehicle or trunk or hatch is opened.

While these lighting arrangements have facilitated vehicle use and safety, opportunities exist to improve user safety and convenience using exterior lighting.

SUMMARY

The systems and methods of the present disclosure control provision of external lighting around a vehicle based on motion of a user. In various embodiments the user has with them a user-carried device that is used to gage user position with respect to the vehicle.

Functions are triggered in the latter case first by the vehicle sensing proximate presence of the user-carried device, such as a key fob, mobile phone, or a wearable device like a smart watch.

The vehicle has sensors tracking user movement near the vehicle. The system can include, for the sensing, one or more sensors sensing position of the user, such as image-based (e.g., camera) and/or laser sensor(s).

As another example, the system can include, for the sensing, one or more sensors sensing position of the user-carried device, such as using radio-frequency identification (RFID).

By providing lighting adjacent the vehicle where the user moves, illuminating the user path and environment visible to the user, the technology promotes safety, convenience, and comfort.

Other aspects of the present invention will be in part apparent and in part pointed out hereinafter.

DESCRIPTION OF THE DRAWINGS

FIG. 2 shows example memory components of the computer architecture of FIG. 1.

Figure 1:
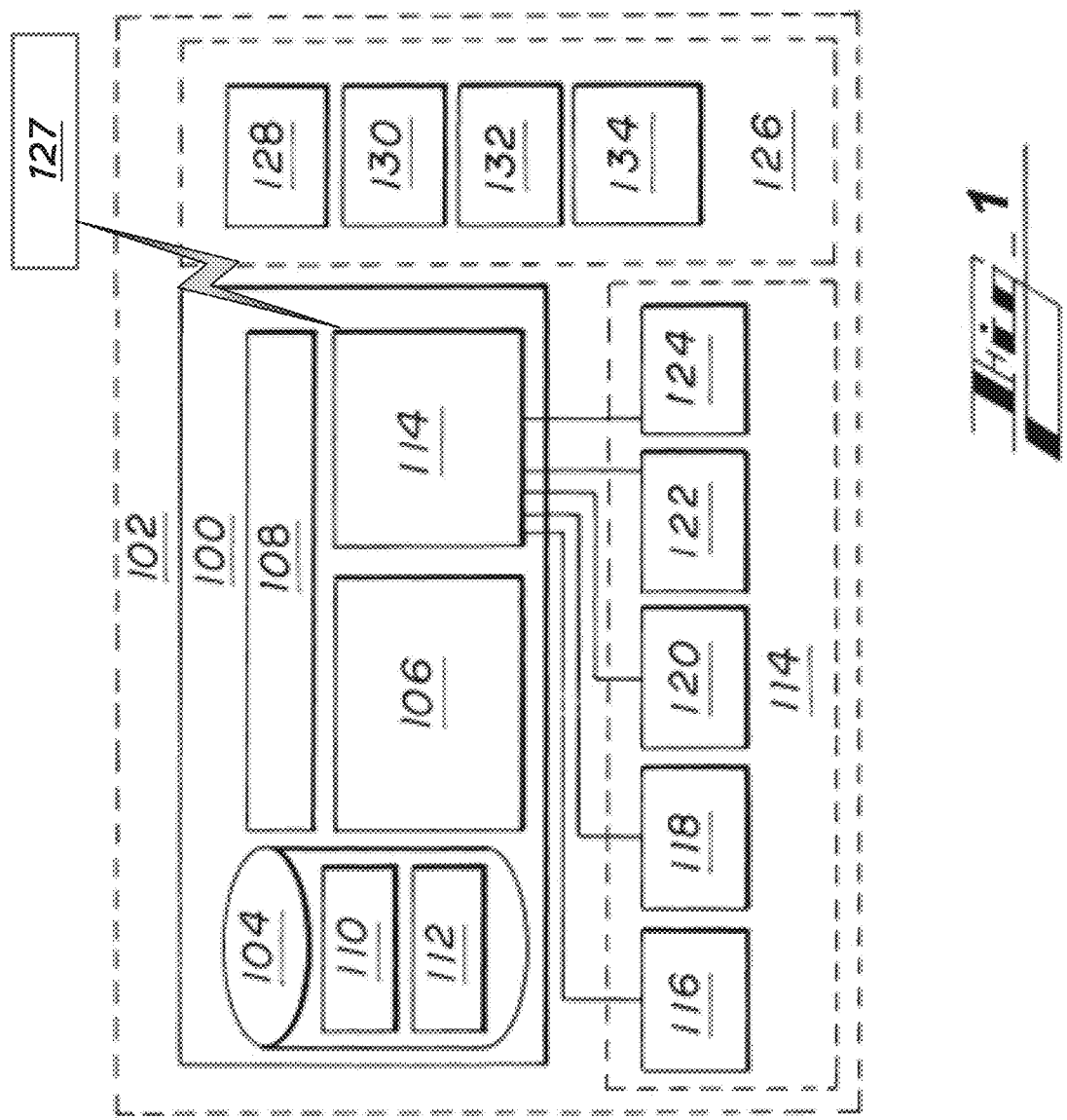
FIG. 1 illustrates schematically illustrates a computer architecture, according to embodiments of the present disclosure.

The figures are not necessarily to scale and some features may be exaggerated or minimized, such as to show details of particular components.

DETAILED DESCRIPTION

I. Introduction

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

The systems and methods of the present disclosure control provision of external lighting around a vehicle based on motion of a user. in various embodiments the user has a user-carried device, used to determine user position.

Appropriate lighting is provided at strategic locations around the vehicle. Lights may be provided beneath the vehicle, configured and arranged to illuminate the ground and above the ground adjacent the vehicle.

In a contemplated embodiment, lighting illuminates an under-vehicle area to allow the user to see more-easily beneath the vehicle.

In another contemplated embodiment, interior lights of the vehicle illuminate when the user is very close to the vehicle, such as within a few feet, to allow the user to see contents of the vehicle and whether there are any people in the vehicle, such as in the back seat or cargo area.

The selective lighting is performed in various embodiments when the vehicle senses proximate presence of the user-carried device, such as a key fob, mobile phone, or a wearable device like a smart watch.

In various embodiments, the vehicle includes sensors determining user presence or movement near the vehicle. The system can include, for the sensing, one or more sensors sensing position of the user, such as image-based—e.g., camera—and/or laser sensor(s).

As another example, the system can include, for the sensing, one or more sensors sensing position of the user-carried device, such as using radio-frequency identification (RFID).

While the present technology is described primarily herein in connection with automobiles, the technology is not limited by the focus. The concepts can be extended to a wide variety of applications, such as aircraft, marine craft, manufacturing or construction machines or equipment, other vehicles, the like, and other.

First example systems are now described, and shown schematically, in connection with FIGS. 1 and 2.

II. On-Board Computing Architecture—FIG. 1

Turning now to the figures and more particularly the first figure, FIG. 1 illustrates a computer-based system 100, such as an on-board computer (OBC) of a vehicle 102.

In the present section, the computer-based system 100 is described primarily as an OBC. The OBC 100 can be, or be a part of, a primary computing unit of the vehicle 102, such as a primary electronic control unit (ECU) of the vehicle 102.

The OBC 100 includes a computer-readable storage medium, or data storage device 104 and also includes a processing hardware unit 106 connected or connectable to the computer-readable storage device 104 by way of a communication link 108, such as a computer bus.

The processing hardware unit 106 can include or be multiple processors, which could include distributed processors or parallel processors in a single machine or multiple machines. The processing hardware unit can be used in supporting a virtual processing environment. The processing hardware unit could include a state machine, application specific integrated circuit (ASIC), programmable gate array (PGA) including a Field PGA, or state machine. References herein to the processing hardware unit executing code or instructions to perform operations, acts, tasks, functions, steps, or the like, could include the processing hardware unit performing the operations directly and/or facilitating, directing, or cooperating with another device or component to perform the operations.

In various embodiments, the data storage device is any of a volatile medium, a non-volatile medium, a removable medium, and a non-removable medium. The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage modules storing computer-readable instructions executable by the processor 106 to perform the functions of the OBC 100 described herein.

For instance, the data storage device 104 includes team-based vehicle-machine framework modules 110. The data storage device 104 in some embodiments also includes ancillary or supporting components 112, such as additional software and/or data supporting performance of the methods of the present disclosure.

The vehicle 102 also includes a lighting and communication sub-system 114 for illuminating lighting selectively, according to the present technology, and communicating with external devices.

The lighting and communication sub-system 114 includes a lighting arrangement 116. The lighting arrangement 116 includes one or more lights positioned about the vehicle 102.

Appropriate lighting is provided at strategic locations around the vehicle 102. Lights may be provided beneath the vehicle, configured and arranged to illuminate the ground and above the ground adjacent the vehicle. In a contemplated embodiment, lighting illuminates an under-vehicle area to allow the user to more-easily see underneath the vehicle. In another contemplated embodiment, interior lights of the vehicle illuminate when the user is very close to the vehicle, such as within a few feet, to allow the user to see contents of the vehicle and whether there are any people in the vehicle, such as in the back seat or cargo area.

The lights can include any suitable type of light, including rope lighting and light-emitting diodes (LEDs), the lights can be provided in any desired color. In various embodiments, the lights are configured to change color, such as based on user preference, communicated by the user. In a contemplated embodiment, lights are configured to deliver light at a brightness and/or color depending on other circumstances, such as time of day or level of ambient light.

Regarding the other lighting and communication sub-system 114 components, referenced by numerals 118, 120, 122, 124, the vehicle 102 can use them to communicate with, for instance, the internet or telephone systems, such as to a remote customer-support center—e.g., the OnStar® system. Such centers have facilities for interacting with vehicle agent team members and their user team members via long-range communications, such as satellite or cellular communications. OnStar is a registered trademark of the OnStar Corporation, which is a subsidiary of the General Motors Company.

The communication components of the lighting and communication sub-system 114 can be in separate sub-systems or modules.

The communication aspect of the sub-system 114 in various embodiments includes a wire-based input/output (i/o) 118, at least one long-range wireless transceiver 120, and at least one short-range wireless transceiver 122. Another port 124 is shown by way of example to emphasize that the system can be configured to accommodate other types of wired or wireless communications.

The long-range transceiver 118 is in some embodiments configured to facilitate communications between the OBC 100 and a satellite and/or a cellular telecommunications network. The short-range transceiver 120 is configured to facilitate short-range communications, such as communications with other vehicles, in vehicle-to-vehicle (V2V) communications, and communications with transportation system infrastructure (V2I).

To communicate V2V, V2I, or with other extra-vehicle devices, such as local communication routers, etc., the short-range communication transceiver 120 may be configured to communicate by way of one or more short-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

The vehicle 102 also includes a sensor sub-system 126 comprising sensors providing information to the OBC 100, such as information indicating presence and movement of a proximate vehicle user. The vehicle 102 can be configured so that the OBC 100 communicates with, or at least receives signals from sensors of the sensor sub-system 124, via wired or short-range wireless communication links 116, 120.

The sensor sub-system 126 includes at least one sensor configured to determine when a user is proximate the vehicle. In some embodiments, this is accomplished using a sensor able to determine when a user-carried device, such as a key fob, phone, or wearable device, is proximate the vehicle 102.

The sensor can include one or more sensors sensing presence of the user-carried device, such as using radio-frequency identification (RFID), passive or active. A user-carried device is indicated schematically by reference numeral 127 in FIG. 1.

In a contemplated embodiment, the vehicle includes a sensor capable of collecting data, about a person near the vehicle 102, with which the system 100 can confirm that the person is the user—e.g., vehicle driver. The sensor can include a biometric sensor, for instance, capable of identifying the user based on facial features, voice, retina features, or other features that can be determined from a relatively small distance.

The sensor sub-system 126 in various embodiments includes at least one sensor configured to determine a position of the user near the vehicle 102. The system can include for the sensing one or more sensors sensing position of the user, such as image-based—e.g., camera—and/or laser sensor(s).

As another example, the system can include for the sensing one or more sensors sensing position of the user-carried device, such as using radio-frequency identification (RFID).

With further reference to the lighting features, in a contemplated embodiment, one or more of the lighting features are movable, such as by an actuator controlled by the processing hardware unit or automatically by the sensor itself based on movement of the user sensed.

As particular examples of vehicle sensors, including those used to assist the present technology and/or vehicle driving, the sensor sub-system 126 can include at least one camera 128 and at least one range sensor 130.

The camera 128 shown schematically can represent one or multiple cameras positioned in any appropriate location of the vehicle 102, such as at vehicle side mirrors, adjacent or at door handles, at a rear decklid, facing out from vehicle head and/or tail lamps, etc.

Each camera 128 is configured to sense presence, or presence and position, of a user and, in some embodiments, user motion. Each camera can be movable, such as by being automatically movable by actuator controlled by the computer system 100 to track a user moving near the vehicle. Cameras can be used in conjunction with other sensors, such as laser-motion detecting sensors.

Range sensors 130, used typically in support of driving functions, including in some models autonomous driving functions, can include a short-range radar (SRR), an ultrasonic sensor, a long-range RADAR, such as those used in autonomous or adaptive-cruise-control (ACC) systems, or a Light Detection And Ranging (LiDAR) sensor.

Sensors sensing user presence, position, and/or motion may be oriented in any of a variety of directions without departing from the scope of the present disclosure. For example, cameras 128 and radar 130 may be oriented at each, or a select, position of, for example: (i) facing forward from a front center point of the vehicle 102, (ii) facing rearward from a rear center point of the vehicle 102, (iii) facing laterally of the vehicle from a side position of the vehicle 102, and (iv) facing diagonally (e.g., between fore and directly laterally) of the vehicle 102.

Other example sensor sub-systems 126 include an inertial-momentum unit (IMU) 132, used mostly in support of autonomous driving functions, such as one having one or more accelerometers, and/or other such dynamic vehicle sensors 134, such as a wheel sensor or a sensor associated with a steering system (e.g., steering wheel) of the vehicle 102.

III. Data Storage and Functions of Stored Modules—FIGS. 2 and 3

FIG. 2 shows in more detail the data storage device 104 of FIG. 1. The components of the data storage device 104 are now described further.

III.A. Memory Components

The data storage device 104 includes, as provided above regarding FIG. 1, one or more modules 110. And the memory may also include ancillary components 112, such as additional software and/or data supporting performance of the methods of the present disclosure.

The ancillary components 112 can include, for example, one or more user profiles. The profiles can including settings, default and/or custom set, for one or more users (e.g., drivers) of the vehicle. These and other data components are described elsewhere, herein, including below in connection with the methods 400, of operation. The technology can be personalized, or customized in these ways.

The modules 110 in various embodiments include at least three (3) modules 202, 204, 206, describe further in the next section.

In one embodiment, the modules 110 include one or more additional modules.

Some code or instructions can be part of more than one module, and functions described herein can be performed by processor execution of the corresponding more than one module.

Functions described herein, but not in connection expressly with one of the three modules 202, 204, 206 can be a part of one of the three modules and/or a part of an additional supporting module or modules 208. The supporting module(s) 208 can include, for example, a user-identification module and/or a passenger-identification module.

Each of the modules can be referred to by any of a variety of names, such as by a term or phrase indicative of its function. The modules 202, 204, 206 of the present system 100 can be referred to as a user-proximity-determination (UPD) module 202, a vehicle-lighting-identification (VLI) module 204, and a vehicle-lighting-activation (VLA) module 206, or the like, for example.

By reference numeral 208 FIG. 2 shows an additional module to indicate expressly that the system 100 can include one or more additional modules.

Any of the modules can include sub-modules, such as shown by reference numerals 210, 212, 214, 216 in connection with the second illustrated module 204 of FIG. 2. Sub-modules can perform specific operations or routines of module functions, such as those described more below.

III.A.i. User-Proximity-Determination (UPD) Module 202

The processing hardware unit 104, executing the user-proximity-determination (UPD) module 202, determines that a user is near the vehicle 102 or at least determines a user position or relative position with respect to the vehicle—e.g., adjacent a left side, left rear, etc.

The operation is dynamic, to keep up with the user, who may be moving around the vehicle, such as from adjacent a trunk area toward a passenger side.

As mentioned, the vehicle sensor sub-system 126 in various embodiments includes at least one sensor configured to determine when a user is proximate the vehicle. This may be accomplished using a sensor able to determine when a user-carried device, such as a key fob, phone, or wearable device is proximate the vehicle. The sensor can include one or more sensors sensing presence of the user-carried device, such as using radio-frequency identification (RFID), passive or active.

In a contemplated embodiment, the vehicle includes a sensor capable of collecting data, about a person near the vehicle, with which the system 100 can confirm that the person is the user—e.g., vehicle driver. The sensor can include a biometric sensor for instance, capable of identifying the user based on facial features, retina features, or other features that can be determined from a small distance.

The sensor sub-system 126 in various embodiments includes at least one sensor configured to determine a position of the user near the vehicle 102, without consulting a user device. The system can include, for the sensing, one or more sensors sensing position of the user, such as image-based (e.g., camera) and/or laser sensor(s).

In a contemplated embodiment, the user mobile device—e.g., smart phone—is configured to send position or relatively position information to the vehicle for use at the vehicle in actuating vehicle lighting selectively. the position information from the mobile device can include GPS information, for instance, or a signal or message indicating where the mobile device, and thus the user, is with respect to the vehicle—e.g., rear, left front, etc.

III.A.ii. Vehicle-Lighting-Identification (VLI) Module 204

The processing hardware unit 106, executing the vehicle-lighting-identification (VLI) module 204, determines which lighting fixture(s), or portion of a lighting fixture(s) (e.g., segments of a lighting rope) to illuminate based on the user position with respect to the vehicle 102.

The operation is dynamic, wherein which lighting features to illuminate can change in real time from moment to moment as the user moves, such as from adjacent a trunk area toward a passenger side.

More than one light can be illuminated at a time, per instruction of the processing hardware unit, depending on system settings and user location. For instance, a light or lights adjacent a trunk of a vehicle, such as under the rear fender, can be illuminated, by instruction of the processing hardware unit, along with lights illuminating a left rear area of the vehicle and a right rear area of the vehicle, when the user is approaching the vehicle from the rear and slightly from the left or right. When the user moves toward the driver door, the rear left light can remain illuminated, by instruction of the processing hardware unit, along with, now, a left-side of vehicle lighting, while the right rear and rear lighting is turned off.

Or a rear exterior light and a rear cargo area light can be illuminated in response to the vehicle computing system determining that the user is at or approaching the rear of the vehicle.

Or only one light can be illuminated at a time, by instruction of the processing hardware unit, such as an exterior lighting closest to a user present or apparent next position based on user position or user movement trajectory, which can be determined continuously or intermittently, in relatively small intervals (1 second, as just one example) of time.

In a contemplated embodiment, the lighting arrangement is configured and controlled by the processing hardware unit to smoothly transition from one lighting area to another as the user transitions from one user-position area to the other. As the user moves from the rear to the driver side, for instance, the lighting effected would smoothly follow the user, instead of the harsher transition of one larger light section being lit suddenly for an area while a light for the previous area (from which the user is moving) turns off.

Fading can be accomplished, for instance, by selectively illuminating and turning off small sections of rope lighting, or by selectively illuminating and turning off lighting elements otherwise for illuminating a relatively small area. In some embodiments, as mentioned, lights are dimmable, and the dimming can be employed to facilitate the smooth transition effect.

As provided, in a contemplated embodiment, one or more of the lighting features are movable, such as by an actuator controlled by the processing hardware unit using feedback of a sensor (s) sensing user motion, or automatically by the lighting feature based on such feedback, or automatically by the sensor itself based on movement of the user sensed. Such are examples features that can promote smooth following with light of the user as they move toward or around the vehicle 102.

As also provided, any of the modules 202, 204, 206, 208 can include sub-modules. Each of the sub-modules can be referred to by any of a variety of names, such as by a term or phrase indicative of its function. As an example, the vehicle-function identification module 204 can include sub-modules 210, 212, 214, 216

The first sub-module 210 can be referred to as a lighting area sub-module. The module 210 can determine a primary area for illuminating, corresponding to the determined user location from the first module 202. In some embodiments, this first sub-module 210 is all that is needed. In other embodiments, other sub-modules are needed to control other lighting effects, such as color, fading, or blinking or strobing, as just a few examples.

The second sub-module 212 can be dedicated to brightness, for embodiments in which brightness of lights is adjustable. The processing hardware unit, executing the module 212, determines in real time amounts by which to brighten or dim lights according to user position and movement. The determination can also depend on default settings or user preferences, of a user profile. The settings can call for brighter light when there is more environmental or ambient light, for instance, such as during dawn or dusk, or there between, to ensure that the light is still recognizable and helpful.

In a contemplated embodiment, one or more lights closest to the user are instructed to be brighter than nearby lights, thereby effectively pointing to the user position.

The third sub-module 214 can be dedicated to color, for embodiments in which color of lights is adjustable. The processing hardware unit, executing the module 212, determines colors for the lights. The determination can depend on default settings or user preferences of a user profile stored at the system 100. As with brightness, determination of color can also depend on default settings or user preferences, of a user profile. The settings can call for certain color light when there is more environmental or ambient light, for instance, such as during dawn or dusk, or there between, to ensure that the light is still recognizable and helpful. Color can also be set by a user based on preference or mood, such as a teenager choosing purple or blue lighting.

In a contemplated embodiment, one or more lights closest to the non-user are instructed to illuminate in a color different than nearby lights, thereby effectively pointing to the user position.

The fourth sub-module 216 is shown to indicate expressly that any of the modules can include one or more additional sub-modules. Additional modules can control for instance, light blinking or strobing, frequency of blinking or strobing, qualities of the smooth transitioning light changes mentioned above, the like, or other.

III.A.iii. Vehicle-Lighting-Activation (VLA) Module 206

The processing hardware unit 106 executing the vehicle-lighting-activation (VLA) module 206 sends signals to the respective lighting component or component(s) to effect the lighting condition determined using the prior module 204.

The illuminating can include which lights, brightness, color, blinking or strobing, including frequency of the blinking or strobing, the like, and other, as provided above.

The operation is also dynamic in embodiments, wherein which lighting features should be instructed to illuminate, and how to illuminate (e.g., brightness) can change in real time from moment to moment as the user moves, such as from adjacent a trunk area toward a passenger side.

IV. Additional Features

Many of the features and embodiments of the present technology are described above. The present section restates some of those and references some others.

In various embodiments, the present technology creates a sense of personal security for users approaching or moving adjacent or around the vehicle.

By controlling the lighting to follow the user, the technology provides light exactly where needed.

In some embodiments, sensors are mounted at or adjacent lower structure of the vehicle and sense (e.g., are actuated by) user position nearby and/or user movement nearby. In various embodiments, such sensor performance is triggered once the system detects that a user-carried (e.g., identification) device, such as a key fob or user phone, is nearby.

Lights can be provided by light strips located under the side, front, and rear structure of the vehicle, including in sections at these areas for finer lighting differences. Each of these lights or sections thereof can light up the ground beneath the lights to several feet away from the vehicle. In some contemplated embodiments, a lighting is arranged (e.g., positioned) at the vehicle to illuminate an under-area of the vehicle, including the ground beneath the vehicle, to allow a user to see under the vehicle.

The lighting features are configured and arranged in various embodiments to provide pleasant yet helpful light where the user moves to approach and around the vehicle, increasing a sense of security, without drawing undue attention.

The present technology also promotes user-vehicle relationship, or the user entrusting or relying on the vehicle, which can increase sales, loyalty to the vehicle and brand, and user satisfaction with and rating for the vehicle.

The present technology can be implemented leveraging many existing hardware used in vehicles, in some cases as-is, and in some cases reconfigured to accomplish the goals described herein.

Sensors mounted around the exterior of the vehicle can be programmed to sense movement. Once triggered, lights mounted around zones of the exterior light up based on user location around the vehicle.

V. Select Advantages

Many of the benefits and advantages of the present technology are described above. The present section restates some of those and references some others. The benefits described are not exhaustive of the benefits of the present technology.

The technology promotes safety, convenience, and comfort, by providing lighting adjacent the vehicle where the user moves, illuminating the user path and environment visible to the user.

The technology enhances a user's sense of personal security, especially when used at night or darker areas, such as in an indoor parking lot.

The technology adds value to vehicles, including by way of the added convenience, comfort, and safety, which can increase sales and user ratings of the vehicles.

The lighting features of the present technology can also provide an emotional boost, or sense of comfort, for the user (knowing, e.g., that they and their family and friends are safer).

The lighting features of the present technology can also impress or give a sense of comfort to others, such as friends or family approaching, or moving about the car with the user.

The lighting features are configured and arranged in various embodiments to provide pleasant yet helpful light where the user moves to approach and around the vehicle, increasing a sense of security, without drawing undue attention.

By only illuminating lights where the user moves, use of electricity for the lighting of the present technology is limited, verses illuminating all exterior vehicle lights, for instance. And lighting fixture life is longer because all lights are used less than if all of the lights were implemented at the same time.

VI. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A user-position-focused vehicle lighting system comprising:
   a hardware-based processing unit; and
   a non-transitory computer-readable storage device comprising:
   a user-position-determination module that, when executed by the processing unit, determines a vehicle user position proximate a vehicle;
   a vehicle-lighting-identification module that, when executed by the processing unit, determines, based on the vehicle user position, which of multiple vehicle lighting features should be illuminated, yielding a presently selected lighting feature; and
   a vehicle-lighting-activation module configured to, when executed by the processing unit, send a signal to the presently selected lighting feature to illuminate the presently selected lighting feature.

2. The user-position-focused vehicle lighting system of claim 1 comprising the multiple vehicle lighting features being configured to activate selectively in response to said signal from the processor executing the vehicle-lighting-activation module.

3. The user-position-focused vehicle lighting system of claim 1 comprising a user-proximity sensor configured and arranged at a vehicle to sense presence of the vehicle user proximate the vehicle, wherein the processing unit executing the user-position-determination module to determine the vehicle user position proximate a vehicle is performed using output from the user-proximity sensor or in response to the output.

4. The user-position-focused vehicle lighting system of claim 1 comprising a user-position sensor configured and arranged at the vehicle to sense position of the vehicle user with respect to the vehicle, wherein the user-position-determination module executing the processing unit to determine a vehicle user position proximate the vehicle is performed using output of the user-position sensor.

5. The user-position-focused vehicle lighting system of claim 1 wherein:
the vehicle user position is a first vehicle user position; and
the modules are configures so that module functions are repeated to determine an updated selected lighting feature corresponding with a second vehicle user position determined while or after the user moves from the first position.

6. The user-position-focused vehicle lighting system of claim 1 wherein the user-position-determination module is configured to, in determining vehicle user position proximate the vehicle, receive a signal from a user-carried device.

7. The user-position-focused vehicle lighting system of claim 1 wherein the user-position-determination module is configured to, in determining that the user is proximate the vehicle using the proximity sensor, receive a signal from a user-carried device.

8. The user-position-focused vehicle lighting system of claim 7 wherein the user-carried device is a key fob, a user wearable device, or other user mobile communication device.

9. The user-position focused vehicle lighting system of claim 1 wherein the non-transitory computer-readable storage device comprises:
a user-proximity-determination module configured to, when executed by the processing unit, determine that the user is proximate the vehicle using the proximity sensor;
wherein the user-position-determination module, when executed by the processing unit, determines the vehicle user position in response to the user-proximity-determination module determining that the vehicle user is proximate.

10. The user-position focused vehicle lighting system of claim 1 wherein the presently selected lighting feature includes one or both of an interior vehicle light and an exterior vehicle light.

11. The user-position focused vehicle lighting system of claim 1 wherein the vehicle-lighting-identification module, with determining which of multiple vehicle lighting features should be illuminated when executed by the processing unit, determines for the presently selected lighting feature at least one option to actuate selected from a group of options consisting of:
one of multiple brightness options for the lighting feature;
one of multiple color options for the lighting feature; and
one of multiple fade-function options for the lighting feature.

12. A non-transitory computer-readable storage device, for use at a user-position-focused vehicle lighting system, comprising:
a user-position-determination module that, when executed by a processing unit, determines a vehicle user position proximate a vehicle;
a vehicle-lighting-identification module that, when executed by the processing unit, determines, based on the vehicle user position, which of multiple vehicle lighting features should be illuminated, yielding a presently selected lighting feature; and
a vehicle-lighting-activation module configured to, when executed by the processing unit, send a signal to the presently selected lighting feature to illuminate the presently selected lighting feature.

13. The non-transitory computer-readable storage device of claim 12 wherein:
the vehicle user position is a first vehicle user position; and
the modules are configures so that module functions are repeated to determine an updated selected lighting feature corresponding with a second vehicle user position determined while or after the user moves from the first position.

14. The non-transitory computer-readable storage device of claim 12 wherein the user-position-determination module is configured to, in determining vehicle user position proximate the vehicle, receive a signal from a user-carried device.

15. The non-transitory computer-readable storage device of claim 12 wherein the user-position-determination module is configured to, in determining that the user is proximate the vehicle using the proximity sensor, receive a signal from a user-carried device.

16. The non-transitory computer-readable storage device of claim 12 comprising:
a user-proximity-determination module configured to, when executed by the processing unit, determine that the user is proximate the vehicle using the proximity sensor;
wherein the user-position-determination module, when executed by the processing unit, determines the vehicle user position in response to the user-proximity-determination module determining that the vehicle user is proximate.

17. The non-transitory computer-readable storage device of claim 12 wherein the presently selected lighting feature includes one or both of an interior vehicle light and an exterior vehicle light.

18. The non-transitory computer-readable storage device of claim 12 wherein:
the vehicle-lighting-identification module, with determining which of multiple vehicle lighting features should be illuminated when executed by the processing unit, determines for the presently selected lighting feature at least one option to actuate selected from a group of options consisting of:
one of multiple brightness options for the lighting feature;
one of multiple color options for the lighting feature; and
one of multiple fade-function options for the lighting feature.

19. A method, performed by a user-position-focused vehicle lighting system having a hardware based processing unit and a non-transitory computer-readable storage device, the method comprising:
determining, by the processing unit executing a user-position-determination module at the storage device, a vehicle user position proximate a vehicle;
determining, by the processing unit executing a vehicle-lighting-identification module of the storage device, based on the vehicle user position, which of multiple vehicle lighting features should be illuminated, yielding a presently selected lighting feature; and sending, by the processing unit executing a vehicle-lighting-activation module, a signal to the presently selected lighting feature to illuminate the presently selected lighting feature.

20. The method of claim 19 wherein:

the vehicle user position is a first vehicle user position; and the determining, determining, and sending are repeated to determine an updated selected lighting feature corresponding with a second vehicle user position determined while or after the user moves from the first position.

* * * * *